H. Strater, Jr
Globe Valve,
Nº 46,726.   Patented Mar. 7, 1865.
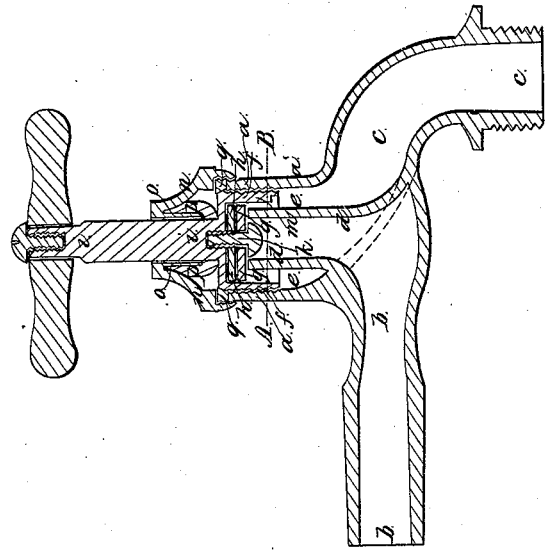
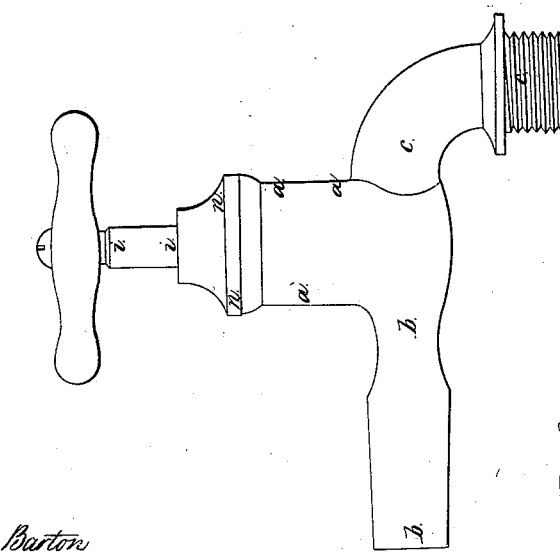
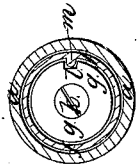
Witnesses.
Samᵈ M. Barton
Joseph Gavett
Inventor.
Herman Strater Jr

UNITED STATES PATENT OFFICE.

HERMAN STRATER, JR., OF BOSTON, MASSACHUSETTS.

FAUCET.

Specification of Letters Patent No. 46,726, dated March 7, 1865.

*To all whom it may concern:*

Be it known that I, HERMAN STRATER, Jr., of Boston, in the county of Suffolk and State of Massachusetts, have invented certain new and useful Improvements in Faucets, and that the following description, taken in connection with the accompanying plate of drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

In the use of faucets generally, and especially for the delivery of hot water or other liquids, a metallic seat or packing has been the one preferred. This packing is preferred on account of its durability and its capability of resisting the action of hot liquids. Leather packing, for instance, is apt to become deteriorated by use and is peculiarly susceptible to the action of hot water or other liquids. But a difficulty has heretofore been experienced in so arranging and operating a metallic packing as to invariably bring it accurately upon its seat. This difficulty has arisen both from the hard, unyielding nature of the packing and from the impossibility of constructing the parts by which it is moved to and from its seat with sufficient nicety as to cause it to bear equally upon the said seat.

By my improvements I am enabled to obtain all the advantages of a metallic packing without the imperfections hereinabove referred to. And I accomplish this desideratum by furnishing the metallic packing with an elastic bed or back, the two being so arranged as to allow the metallic packing to yield sufficiently to insure its accurate bearing upon its seat whatever may be its inclination when it first strikes the latter.

I have also made an improvement to prevent leakage about the stem of the valve, and other improvements which will be hereinafter referred to and explained.

My improvements are represented in the accompanying plate of drawings, of which, Figure 1 is an elevation or side view of my improved faucet. Fig. 2 a central longitudinal vertical section of the same, and Fig. 3 a section taken in the plane of the line A, B, looking up.

$a, a, a$, in the drawings represent the outer tube of the faucet, connected with which is the supply pipe or tube $b, b$, and exit pipe or tube $c, c$. The supply tube $b, b$ extends some distance above its horizontal axis into the main tube $a, a$, so that the extension tube $d, d$, forms at its curve nearly a right-angle with the supply tube $b, b$, leaving a chamber $e, e$, between the tube $d, d$, and the outer tube $a, a$.

$f, f$, is a hollow screw-plug, or valve, which works in a female screw formed on the inner surface of the tube $a, a$. Within this screw-plug $f, f$, is inserted the metallic washer $g, g$ and its rubber, or other elastic bed or back $h, h$. This washer $g, g$ and its backing $h, h$ are attached to the stem $i, i$ by means of the pin or screw $k$, which is so constructed as to allow of a free upward and downward movement of the washer $g, g$ and its back $h, h$, as shown in the dotted lines. On the side of the washer $g, g$ a slot $l$ is formed in which a stop $m$ is fitted so as to prevent the slipping of the metallic washer upon its elastic backing which would soon grind away the latter if the metallic washer were allowed to rotate independently of the screw-plug, which would otherwise be the case when the metallic washer was turned down upon its seat.

From the foregoing description it will be seen that when the valve, or plug, $f, f$, is screwed down the metallic washer, or packing $g, g$, owing to the play that it has on the pin $k$, and the elasticity of pressure furnished by the rubber, or other elastic backing, will come to a firm and accurate bearing upon its seat on the top of the extension tube $d, d$, whatever may be its inclination when it strikes the latter or however unevenly the plug, or valve, may travel in its socket, which could not be the case if the metallic packing had a rigid and unyielding bearing in the screw-plug.

In the top of the cap-piece $n, n$, a sleeve $o, o$, is formed, around which is fitted a rubber, or other elastic, packing $p, p$, which extends over the bottom of the sleeve and hugs tightly to the stem $i, i$, and when the cap is screwed down is firmly pressed against the top of the valve or screw plug $f, f$, so as to prevent any leakage between the stem $i, i,$ and the valve $f, f$.

By this construction when a hose or other pipe, is attached to the faucet, creating pressure of the liquid within the body thereof, said pressure in that part of the chamber surrounding the rubber $p, p$, causes said rubber to pack tightly against and around the stem $i$, below the sleeve $o$, making the joint between cap and stem impervious.

In the bottom of the cap is inserted a leather or other washer $q, q$, which when the cap $m, m$ is screwed down comes to a firm bearing upon the top of the outer tube $a, a$, and thus prevents any leakage liable to occur from the upward, or back pressure of the water.

The chamber $c, c$ connects with the exit-pipe $c, c$ in the manner shown by the dotted lines, so that the water is conducted directly to the exit-pipe.

Having thus described my improvements, what I claim as my invention and desire to have secured to me by Letters Patent is—

1. I claim the arrangement of the sleeve $a, a$, and the elastic packing $p, p$, placed within the cap $n, n$, as described.

2. Also, in combination with the above arrangement the metallic packing, furnished with an elastic backing and operating substantially as described.

3. Also, the stop $m$ for preventing the wear of the metallic washer on its backing as described.

HERMAN STRATER, Jr.

Witnesses:
 JOSEPH GAVETT,
 SAML. M. BARTON.